United States Patent
Jung et al.

(10) Patent No.: US 12,386,657 B2
(45) Date of Patent: Aug. 12, 2025

(54) METHOD OF SUPPORTING PERSISTENCE AND COMPUTING DEVICE

(71) Applicants: MemRay Corporation, Gyeonggi-do (KR); Korea Advanced Institute of Science and Technology, Daejeon (KR)

(72) Inventors: Myoungsoo Jung, Daejeon (KR); Miryeong Kwon, Daejeon (KR); Gyuyoung Park, Daejeon (KR); Sangwon Lee, Daejeon (KR)

(73) Assignees: MemRay Corporation, Gyeonggi-do (KR); Korea Advanced Institute of Science and Technology, Daejeon (KR)

( * ) Notice: Subject to any disclaimer, the term of this patent is extended or adjusted under 35 U.S.C. 154(b) by 619 days.

(21) Appl. No.: 17/698,323

(22) Filed: Mar. 18, 2022

(65) Prior Publication Data
US 2022/0318053 A1    Oct. 6, 2022

(30) Foreign Application Priority Data

Apr. 5, 2021   (KR) ................. 10-2021-0043855
Sep. 29, 2021  (KR) ................. 10-2021-0128691

(51) Int. Cl.
*G06F 11/00*     (2006.01)
*G06F 1/30*      (2006.01)
(Continued)

(52) U.S. Cl.
CPC .............. *G06F 9/4881* (2013.01); *G06F 1/30* (2013.01); *G06F 3/0619* (2013.01);
(Continued)

(58) Field of Classification Search
CPC ........ G06F 9/4881; G06F 1/30; G06F 3/0619; G06F 3/0632; G06F 3/0679; G06F 9/4403; G06F 11/1441
(Continued)

(56) References Cited

U.S. PATENT DOCUMENTS 5,317,752 A * 5/1994 Jewett ................. G06F 11/2015
                                                     714/24
9,442,793 B2   9/2016 Shacham et al.
(Continued)

FOREIGN PATENT DOCUMENTS

KR     20010056292 A    7/2001
KR    1020160034939 A   3/2016
(Continued)

OTHER PUBLICATIONS

Dushyanth Narayanan and Orion Hodson. "Whole-System Persistence." In Proceedings of the seventeenth International conference on Architectural Support for Programming Languages and Operating Systems (ASPLOS '12). ACM, 2012.
(Continued)

*Primary Examiner* — Jason B Bryan
(74) *Attorney, Agent, or Firm* — Dinsmore & Shohl LLP

(57) ABSTRACT

A processor of the computing device includes a plurality of cores and executes one or more instructions stored in a memory module including a non-volatile memory, thereby performing a stop procedure upon a power failure and performing a go procedure upon power recovery. In the stop procedure, the processor accesses process control blocks of processes being run, scheduling each process to a run queue of a corresponding first core among first cores included in the cores, removes the scheduled process from the run queue and makes the removed process wait in a waiting queue, executes an idle task, and stops a device included in the computing device.

19 Claims, 17 Drawing Sheets

(51) Int. Cl.
*G06F 3/06* (2006.01)
*G06F 9/4401* (2018.01)
*G06F 9/48* (2006.01)
*G06F 11/14* (2006.01)

(52) U.S. Cl.
CPC .......... *G06F 3/0632* (2013.01); *G06F 3/0679* (2013.01); *G06F 9/4403* (2013.01); *G06F 11/1441* (2013.01)

(58) Field of Classification Search
USPC .......................................................... 714/24
See application file for complete search history.

(56) References Cited

U.S. PATENT DOCUMENTS

| | | | |
|---|---|---|---|
| 10,241,829 B2 | 3/2019 | Aoyama et al. | |
| 10,545,562 B2 | 1/2020 | Jang et al. | |
| 10,929,236 B2 | 2/2021 | Cho | |
| 11,016,890 B2 | 5/2021 | Stonelake et al. | |
| 2006/0268321 A1* | 11/2006 | Brack | G06F 9/4881 358/1.15 |
| 2017/0255559 A1 | 9/2017 | Burstein et al. | |
| 2020/0285420 A1* | 9/2020 | Guim Bernat | G06F 3/0659 |

FOREIGN PATENT DOCUMENTS

| | | |
|---|---|---|
| KR | 1020160083916 A | 7/2016 |
| KR | 20180004956 A | 1/2018 |
| KR | 1020190073768 A | 6/2019 |
| KR | 20200108367 A | 9/2020 |

OTHER PUBLICATIONS

Fang Su, Kaisheng Ma, Xueqing Li, Tongda Wu, Yongpan Liu, and Vijaykrishnan Narayanan. "Nonvolatile processors: Why is it trending?" In Design, Automation Test in Europe Conference Exhibition (DATE), 2017. IEEE, 2017.

Kaisheng Ma, Yang Zheng, Shuangchen Li, Karthik Swaminathan, Xueqing Li, Yongpan Liu, Jack Sampson, Yuan Xie, and Vijaykrishnan Narayanan. "Architecture exploration for ambient energy harvesting nonvolatile processors." In 2015 IEEE 21st International Symposium on High Performance Computer Architecture (HPCA'15). IEEE, 2015.

Yiqun Wang, Yongpan Liu, Shuangchen Li, Daming Zhang, Bo Zhao, Mei-Fang Chiang, Yanxin Yan, Baiko Sai, and Huazhong Yang. "A 3us wake-up time nonvolatile processor based on ferroelectric flip-flops." In 2012 Proceedings of the ESSCIRC (ESSCIRC'12). IEEE, 2012.

* cited by examiner

METHOD OF SUPPORTING PERSISTENCE AND COMPUTING DEVICE

CROSS-REFERENCE TO RELATED APPLICATION

This application claims priority to and the benefit of Korean Patent Application No. 10-2021-0043855 filed in the Korean Intellectual Property Office on Apr. 5, 2021, and Korean Patent Application No. 10-2021-0128691 filed in the Korean Intellectual Property Office on Sep. 29, 2021, the entire contents of which are incorporated herein by reference.

BACKGROUND

(a) Field

The described technology generally relates to a persistence support method and a computing device.

(b) Description of the Related Art

Recently, persistent memory technologies have received significant attention as they can considerably improve the performance of datacenters and high-performance computers. Specifically, in many computing domains, back-end storage is required for recovery from system failures and crashes. As persistent memory can spontaneously and instantaneously recover all memory states, it can eliminate a large number of accesses to the back-end storage as well as associated runtime overheads.

However, the existing persistence mechanisms are limited to make the system fully non-volatile, and introduce significant overhead. For example, system images, including hibernation and sleep, are infeasible to offer orthogonal persistence when the system faces a power failure. For the failure, the hibernation requires serializing the entire system image, which cannot succeed without the assistance of external power sources. On the other hand, checkpoint-restarts introduce serious system overhead due to redundant data dumps. Furthermore, many of checkpoint-restarts are not completely non-volatile, which means that they need to reboot the kernel and exhibit extra latency to detect the exact resumption point.

SUMMARY

Some embodiments may provide a persistence support method and a computing device for providing persistence upon power failure.

According to an embodiment of the present invention, a method of supporting persistence of a computing device may be provided. The computing device may include a memory module including a non-volatile memory and a processor including a plurality of cores including a plurality of first cores. The method may include performing a stop procedure including a first procedure and a second procedure upon a power failure. The performing the first procedure may include accessing process control blocks of a plurality of processes being run, scheduling each process to a run queue of a corresponding first core among the plurality of first cores, removing the scheduled process from the run queue and making the removed process wait in a waiting queue, and executing an idle task. The performing the second procedure may include stopping a device included in the computing device.

In some embodiments, the plurality of cores may further include a second core. The second core may perform the accessing the process control blocks, the scheduling each process, and the stopping the device. The first cores may perform the removing the scheduled process, the executing the idle task, and the making the removed process wait.

In some embodiments, a core executing an interrupt handler configured to handle an event of the power failure among the plurality of cores may become the second core.

In some embodiments, the scheduling each process may include sending an interrupt to the corresponding first core after scheduling each process in the run queue of the corresponding first core.

In some embodiments, the performing the first procedure may further include setting a system-wide persistent flag upon the power failure. The accessing the process control blocks may include setting a signal pending flag of the process control block of each process while accessing the process control blocks.

In some embodiments, the making the removed process wait may include executing a signal handler in response to the signal pending flag, and setting, by the signal handler, each process to an uninterruptible state in response to the persistent flag.

In some embodiments, the stopping the device may include disabling the device and storing context information of the device to a device control block of the memory module.

In some embodiments, the stopping the device may further include stopping the device based on a device power management mechanism.

In some embodiments, the plurality of cores may further include a second core. The performing the second procedure may further include preparing offline of the first cores, and storing a register of the second core to the memory module.

In some embodiments, the preparing the offline may include initializing a kernel pointer of each first core to null, flushing a cache of each first core, executing a fence instruction, and reporting to the second core that each first core is ready to be offline in response to memory requests of each first core being completed.

In some embodiments, the storing the register may include switching an execution environment from a kernel to a bootloader in response to a report that the first cores are ready to be offline from the first cores, storing the register to a bootloader control block of the memory module, and storing a commit indicating that the stop procedure has been performed to the bootloader control block.

In some embodiments, the register of the second core may include a register required to perform a go procedure to be performed upon power recovery. The register required to perform the go procedure may include a return address where a system is to be re-executed in the go procedure.

In some embodiments, the switching the execution environment may include raising a system-level exception to switch the execution environment from the kernel to the bootloader. An address of a kernel-side instruction following an instruction for the system-level exception may be recorded to a machine exception program counter as the return address.

In some embodiments, the method may further include performing a go procedure upon power recovery. The plurality of cores may further include a second core. The performing the go procedure may include restoring a register stored in the memory module to the second core, performing initialization of the second core and the first cores, setting a kernel pointer of each first core and sending an interrupt to each first core, and accessing the process control blocks of the processes to schedule the processes.

In some embodiments, the register may be stored in a bootloader control block of the memory module, and the performing the go procedure may further include switching an execution environment from a bootloader to a kernel after performing the initialization.

In some embodiments, the register may store a return address that is a next address of a last instruction that has executed the stop procedure, and the switching the execution environment may include moving to the return address.

In some embodiments, the performing the go procedure may further include executing, by the first cores, idle tasks and waiting to be scheduled after the kernel pointer of each first worker is set.

In some embodiments, the performing the go procedure may further include checking a commit indicating that the go procedure has performed, and performing the go procedure in response to the commit being valid.

According to another embodiment, a computing device including a memory module including a non-volatile memory and a processor may be provided. The processor may include a plurality of cores including a plurality of first cores, and may, by executing one or more instructions stored in the memory module, perform a stop procedure upon a power failure, and perform a go procedure upon power recovery. In the stop procedure, the processor may access process control blocks of a plurality of processes being run, schedule each process to a run queue of a corresponding first core among the plurality of first cores, remove the scheduled process from the run queue and make the removed process wait in a waiting queue, execute an idle task, and stop a device included in the computing device.

According to yet another embodiment of the present invention, a computer program stored in a non-transitory computer-readable medium may be provided. The computer program, when executed by a computing device including a memory module including a non-volatile memory and a processor including a plurality of cores, may configure the computing device to execute, upon a power failure, accessing process control blocks of a plurality of processes being run, scheduling each process to a run queue of a corresponding first core among the plurality of first cores, removing the scheduled process from the run queue and making the removed process wait in a waiting queue, executing an idle task, and stopping a device included in the computing device.

DETAILED DESCRIPTION OF THE EMBODIMENTS

Figure 1:
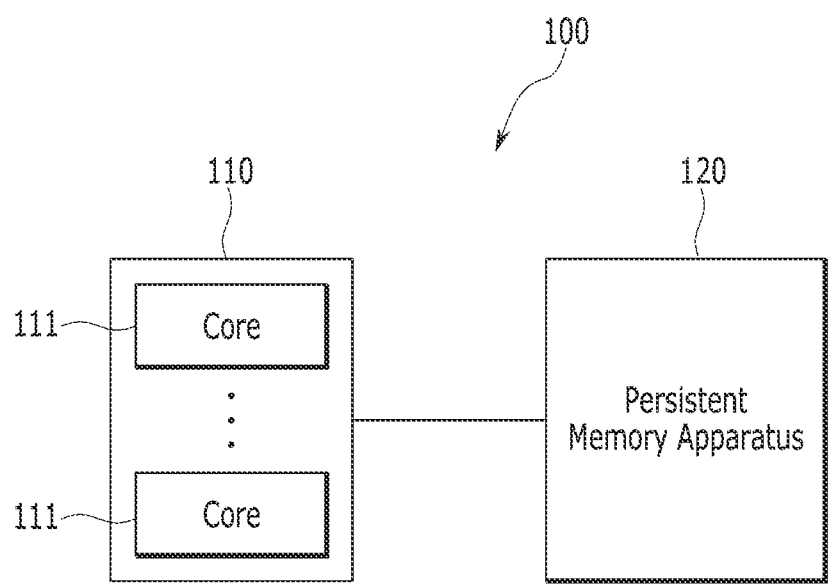
FIG. 1 is a block diagram of an example of a computing device according to an embodiment.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

As used herein, the singular forms "a", "an" and "the" are intended to include the plural forms as well, unless the context clearly indicates otherwise.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

FIG. 1 is a block diagram of an example of a computing device according to an embodiment. FIG. 1 shows an example of a possible computing device, and a computing device according to an embodiment may be implemented by various structures.

Referring to FIG. 1, a computing device 100 according to an embodiment includes a processor 110 and a persistent memory apparatus 120.

The processor 110 executes one or more instructions to perform various operations (e.g., arithmetic, logic, control, and input/output operations). The processor may include, for example, a central processing unit (CPU), a microprocessor, a graphics processing unit (GPU), a microprocessor, or an application processor (AP), but is not limited thereto. In some embodiments, the processor 110 may include a plurality of processing cores 111.

The persistent memory apparatus 120 is accessed and used by the processor 110. In some embodiments, the persistent memory apparatus 120 may be a system memory (main memory) of the computing device 100. In some embodiments, the computing device 100 may further include a storage device.

The persistent memory apparatus 120 may include a non-volatile memory. In some embodiments, the non-volatile memory may be a resistance switching memory. In some embodiments, the resistance switching memory may include a phase-change memory (PCM) using a resistivity of a resistance medium (phase-change material). In another embodiment, the resistance switching memory may include a resistive memory using a resistance of a memory device, or a magnetoresistive memory. The PCM, in particular, a phase-change random access memory (PRAM) is described as an example of the resistance switching memory in below embodiments.

In some embodiments, the processor 110 and the persistent memory apparatus 120 may operate as a persistence apparatus that provides a persistence service.

First, a hardware subsystem of a persistent memory apparatus according to various embodiments of the present invention is schematically described.

Figure 2:
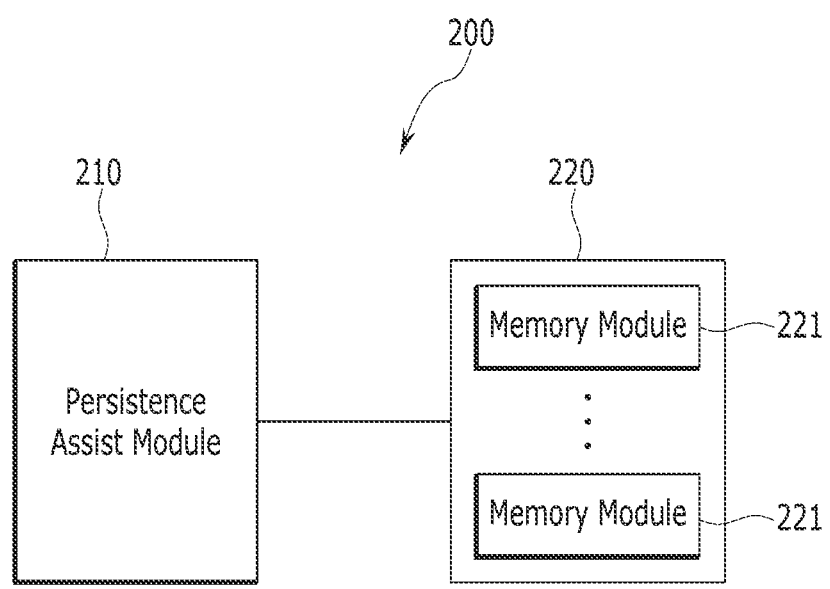
FIG. 2 is a diagram showing an example of a persistent memory apparatus according to an embodiment.
Figure 3:
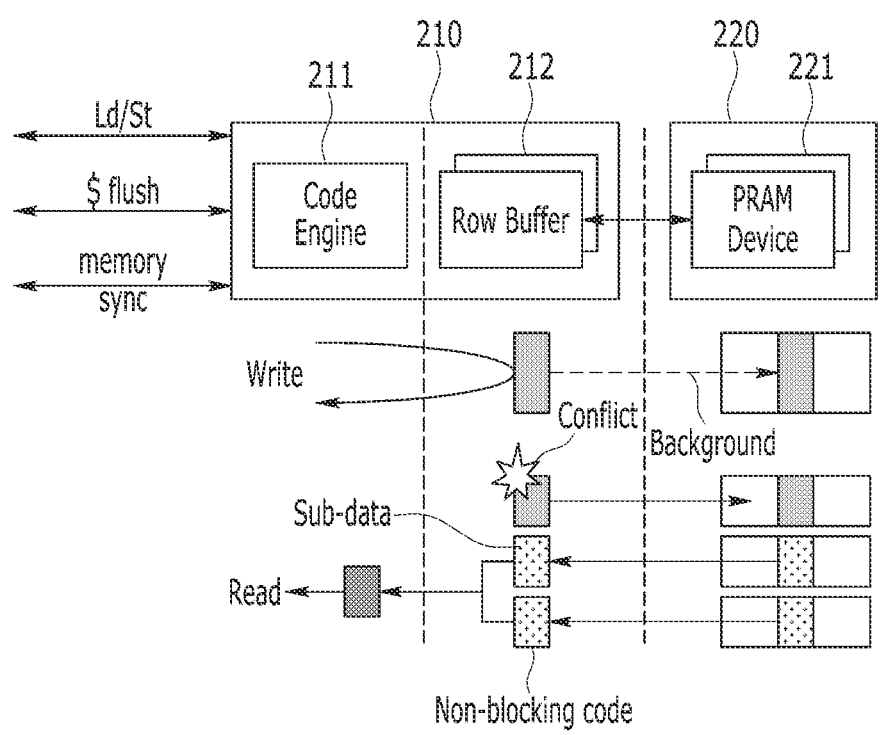
FIG. 3 is a diagram showing an example of a persistent memory apparatus according to an embodiment.

FIG. 2 is a diagram showing an example of a persistent memory apparatus according to an embodiment, and FIG. 3 is a diagram showing an example of a persistent memory apparatus according to an embodiment.

Referring to FIG. 2, a persistent memory apparatus 200 includes a persistence assist module (PSM) 210 and a persistent memory module 220. In some embodiments, the persistent memory apparatus 200 may be connected to a processor (e.g., 110 in FIG. 1) via a system memory bus.

In some embodiments, the persistent memory apparatus 200 may eliminate dynamic random-access memory (DRAM)-related hardware required in the conventional persistent memory from a memory path such that it keeps volatile resources as small as an operating system (OS) can quickly turn states of the volatile resources to be persistent. The DRAM-related hardware required in the conventional persistent memory (e.g. Optane™ memory) may include, for example, a DRAM controller, a near memory cache (NMEM) controller, a load-storage queue (LSQ), and an on-DIMM memory (e.g., static random-access memory (SRAM) and DRAM). In some embodiments, the persistent memory module 220 may include a memory module, i.e., a PRAM module 221. In some embodiments, the PRAM module 221 may be implemented as a dual in-line memory module (DIMM). In some embodiments, the persistent memory module 220 may include a plurality of PRAM modules 221, for example, DIMMs. In some embodiments, the PRAM module 221 may include a plurality of RPAM devices, and each PRAM device may be a device formed in the PRAM module 221, for example, a PRAM chip or a PRAM package.

In some embodiments, the persistence support module 210 may manage resource conflict and reliability issues, and the persistent memory module 220 may be designed toward increasing parallelism to manage cache flushes as soon as possible. All processes running in the processor (e.g., 110 of FIG. 1) may issue memory requests to the persistent memory module 220 through the persistence support module 210, like a traditional memory. Applications and an OS kernel may directly run on the persistent memory apparatus 200 without overhead imposed by internal components of the persistent memory apparatus 200. Thus, stack, heap, and code regions of the applications or OS kernel may be almost persistent during executions.

In general, the most challengeable part of building DRAM-replaceable non-volatile memory subsystem is to catch up with read performance rather than write performance of the DRAM. Basically, there are many studies to hide the write latency of the non-volatile memory by allowing asynchronous operations with employment of intermediate high-performance memory such as buffering, caching, and aggregation. However, the read latency cannot be easily shortened by using such system-level approaches when targeting to use the non-volatile memory as a working memory.

As shown in FIG. 3, the persistence support module 210 may directly serve read requests from the memory module 220 in order to utilize a high read speed of the low-level PRAM device. The persistence support module 210 may directly server write requests from the memory module 220 like the read requests.

In some embodiments, the persistence support module 210 may use a buffer 212 for each PRAM device 221 of the memory module 220 for the write requests. In some embodiments, the buffer 212 may be a row buffer. That is, the persistence support module 210 may store the target data of the write request in the row buffer 212, and then store (flush) the target data from the row buffer 212 to the target location of the memory module 220 in the background. In some embodiments, the row buffer 212 may employ, for example, a row buffer used in a traditional DRAM. The row buffer 212 may be different from a system-level buffering and caching scheme, as it only removes the conflict latency imposed by multiple writes targeting a specific region.

With assistance of the persistent memory apparatus 200, the processor (e.g., 110 of FIG. 1) may wait for write completion only when the OS faces a power failure. Since writes are normally served as asynchronous, write latency may be tolerable. However, an issue may be a read targeting a location of the persistent memory apparatus 200 in which the write is already being performed. If a single row buffer 212 is provided for each PRAM device 221, the processor 110 may read a place where the row buffer 212 is closed, which can be observed in concurrent memory accesses. To address this resource conflict issue, in some embodiments, when a read request is directed to a location where data writing from the row buffer 212 to the persistent memory module 220 is in progress, the persistence support module 210 may serve the read request by regenerating target data from a non-blocking code read from a separate module (code engine) 211 and sub-data read from the non-conflicting PRAM device 221 without waiting to complete the data writing.

In some embodiments, the persistence support module 210 may expose a cache dump interface or a memory synchronization interface in addition to a read/write (or load/store) interface (ld/st). The cache dump interface may be used to flush cache space ($ flush), and the memory synchronization interface may be used to flush the row buffer 212 (i.e., for memory synchronization).

Figure 4:
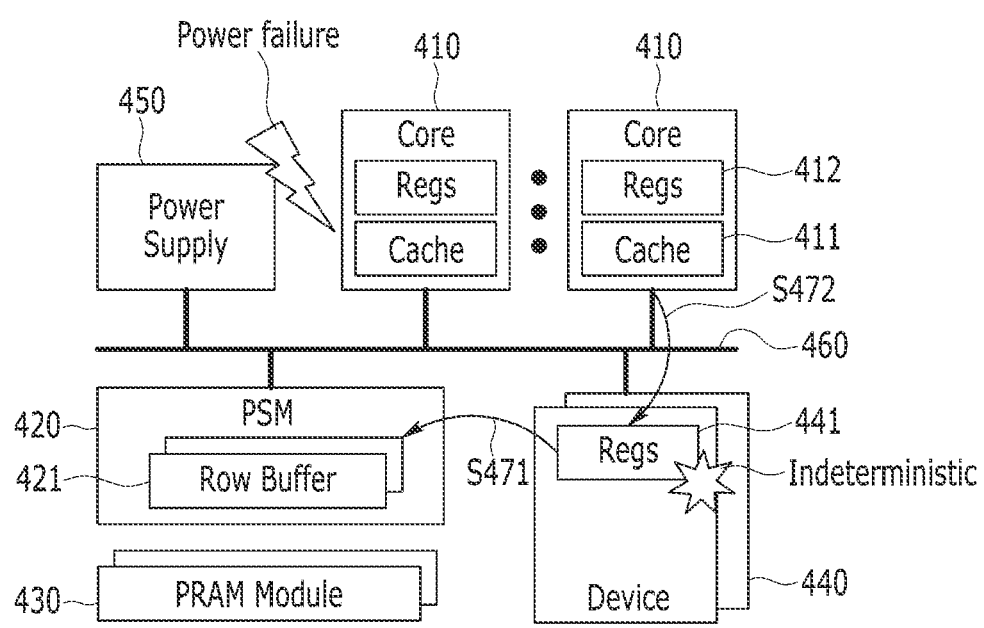
FIG. 4 is a diagram for explaining an example of a persistence issue to be addressed by a computing device according to an embodiment.
Figure 5:
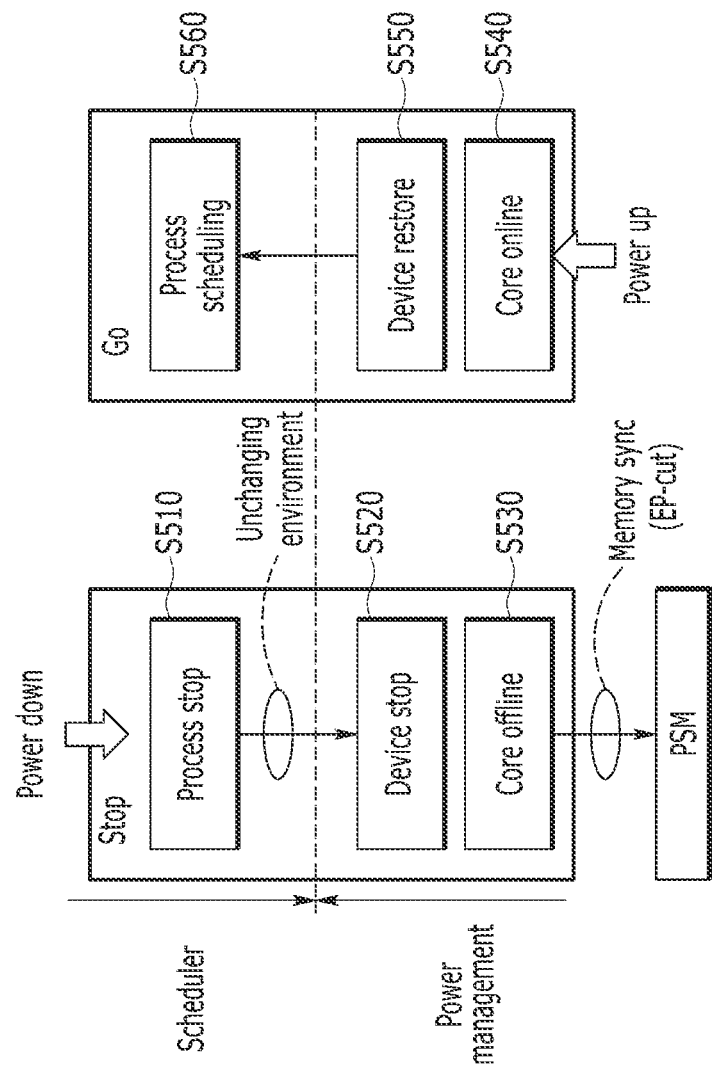
FIG. 5 is a diagram for explaining an example of a persistence support method in a computing device according to an embodiment.

FIG. 4 is a diagram for explaining an example of a persistence issue to be addressed by a computing device according to an embodiment, and FIG. 5 is a diagram for explaining an example of a persistence support method in a computing-device according to an embodiment.

Referring to FIG. 4, a processor, e.g., a plurality of processing cores 410, is connected to a persistent memory apparatus via a memory interface (e.g., a memory bus) 460. The memory interface 460 is connected to a persistent memory module 430 through a persistence support module 420 of the persistent memory apparatus. Each processing core 410 may include a cache 411 and/or a register 412, and the persistence support module 420 may include a row buffer 421. In some embodiments, while the persistent memory apparatus may provide data persistence at a power event, such as a power failure of a power supply 450, and may allow a host to use the conventional memory interface instead of a device file interface, there may be non-persistent states managed by on the caches 411 and the registers 412 on the cores 410 or the persistence support module 420. The persistence support module 420 (e.g., the row buffer 421) may also hold outstanding requests that are not yet completely written to the memory module 430. A peripheral device 440 (e.g., a register 441 of the peripheral device 440) may also hold outstanding requests that are not yet completely written. That is, the cache 411 and register 412 of the core 410, the row buffer 421 of the persistence support module 420, and the register 441 of the device 440 may be non-persistent hardware. To address such non-persistence issue, in some embodiments, a set of instructions, i.e., a program that provides a single execution persistence cut (hereafter referred to as "EP-cut") where the system may safely perform re-execution without losing contents. In some embodiments, such a program may be provided as an OS-level program, for example, instruction codes included in the OS. Such an OS may be referred to as a "persistence-centric OS".

The single EP cut may remove unnecessary cache flushes and memory synchronization while providing execution persistence. However, it is challenging to make all information of processes running on the plurality of cores 410 persistent in one shot. For example, even though the persistence support module 420 successfully dumps the registers 412 of all cores 410 and flushes all outstanding requests including the cache 411 and the peripheral device 440 to the memory module 430 at S471, a certain process of the core 410 may further change a device state (e.g., the register 441) of the peripheral device 440 at S472 before completely running out a power inactivation delay time. Further, a sleeping process may be scheduled in a brief space of time, which can make a machine state indeterministic. Furthermore, there is a need to quickly make the states of the processes running on the multiple cores 410 persistent, in a synchronized and consistent manner, such that the processes can be re-execute from the EP cut.

To address these issues, in some embodiments, the persistence-centric OS may use a Stop-and-Go (SnG) that is triggered by a power event signal and turns a non-persistent state to persistent within the power inactivation delay time. As shown in FIG. 5, all procedures for generating an EP cut may be referred to as a "Stop" procedure, and a procedure from a point at which the system should restart may be referred to as a "Go" procedure. When a power interrupt arises, the SnG may make all necessary volatile runtimes persistent, and confirm corresponding connected devices stopped in a power hold-up time (e.g., duration between when the interrupt arises and a point before the power rails fall out of specification to 95% of their nominal value).

In some embodiments, the SnG may first stop all processes and lockdown them across multiple cores at S510. This may correspond to a scheduler function of the persistence-centric OS. During this phase, the SnG may visit all sleep processes and wake them up by considering processor (e.g., CPU) load balancing. As the SnG is bound to a core (hereinafter referred to as a "master tile") (or a "second core") that is invoked by the power interrupt among a plurality of cores of the CPU, the SnG may assign the waken process to the other core (hereinafter referred to as a "worker tile") (or a "first core") and give an interrupt (e.g., interprocessor interrupt (IPI)) to the worker tile assigned to handle the waken process. The SnG may keep iterating this procedure until there is no remaining process. Further, an SnG's interrupt handler of the worker tile may reschedule the just-waken process to a run queue. During rescheduling, the SnG may make the target process yield all the time such that it cannot be scheduled anymore. Since all cores have a similar number of tasks, including running and waken processes, stopping the tasks can be achieved as much as the target system can perform in a balanced manner. Through this process, SnG can secure an unchanging environment for multiple cores.

If the SnG secures an unchanging environment for the multiple cores, the SnG may stop necessary devices and peripheral devices by collaborating with corresponding drivers at S520. The SnG may then dump a volatile state of each core to a designated space in the persistent memory apparatus. Since some CPU registers may be invisible to even a kernel, such as IPI, power-down, and security registers, the SnG may jump to a system bootloader and store all registers to the persistent memory apparatus. The master tile may in parallel send the IPIs for each worker tile to make the worker tiles offline one by one at S530. At this time, each core may flush (dump) the cache to the persistence memory apparatus and may be suspended until the cache flushes complete. Lastly, in S530, the system bootloader may flush a cache of the master tile and perform memory synchronization such that there are no outstanding requests before making all the cores offline. The memory synchronization may be performed by cache flush and memory fence instructions. Accordingly, the EP-cut can be drawn.

When the power is recovered, the SnG may examine whether a system initialization request is related to a cold boot or power recovering case. In the power recovering case, the SnG may perform a Go procedure that loads system contexts from the persistence memory apparatus and re-executes all processes from the EP-cut. In some embodiments, in the Go procedure, SnG may make the cores online at S540, restore the devices at S550, and reschedule the processes at S560.

Next, a persistence support method and a program therefor according to various embodiments are described with reference to FIG. 6 to FIG. 14.

In some embodiments, the EP-cut of the persistence-centric OS may proceed with a plurality of procedures of the Stop procedure. In some embodiments, the plurality of procedures of the Stop procedure may include a Drive-to-Idle procedure (or a "first procedure") and an Auto-Stop procedure (or a "second procedure"). While the Drive-to-Idle procedure may be a procedure for ensuring that all user and kernel processes do not change an execution environment, the Auto-Stop procedure may be a procedure for dumping device states to a persistent memory apparatus, cleaning up a cache and a row buffer of the persistent memory apparatus, and completely powering down all the cores.

First, the Drive-to-Idle procedure is described with reference to FIG. 6 and FIG. 7.

Figure 6:
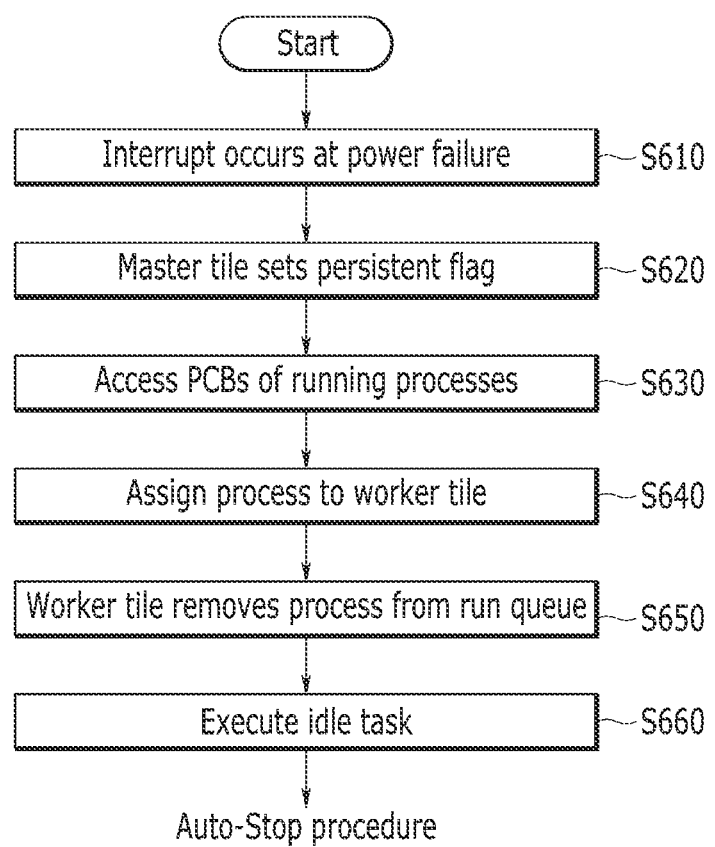
FIG. 6 is a flowchart showing an example of a Drive-to-Idle procedure in a persistence support method according to an embodiment.
Figure 7:
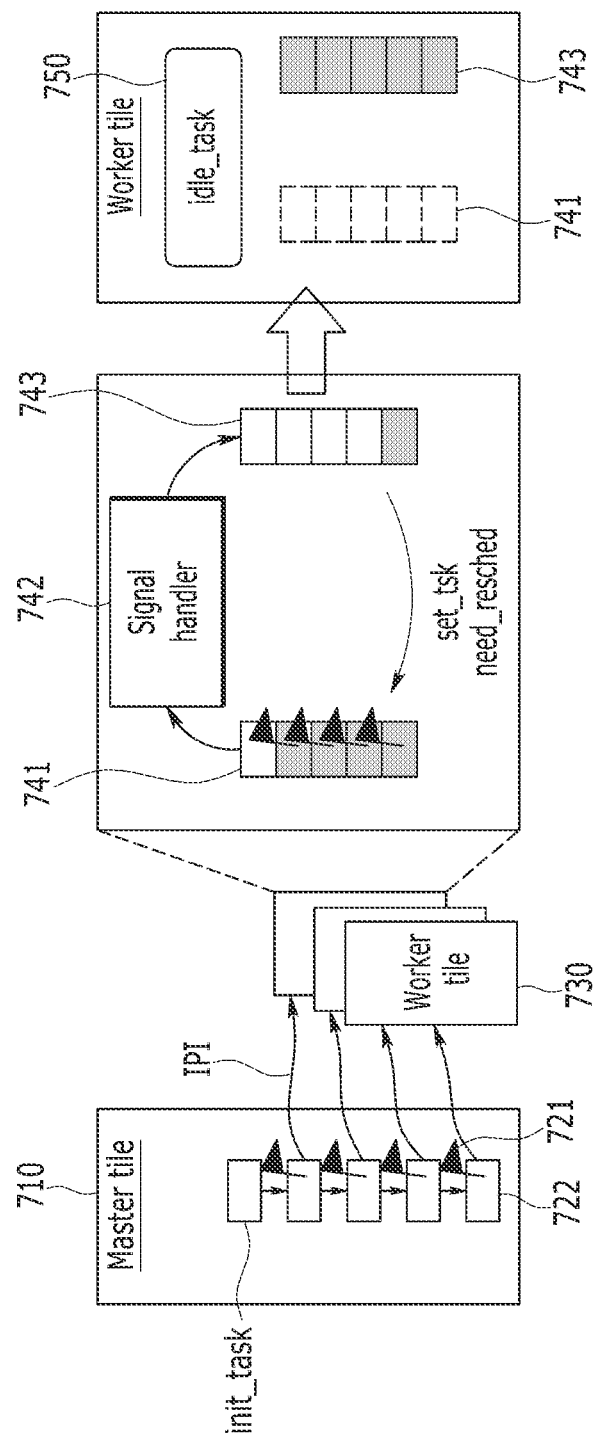
FIG. 7 is a diagram for explaining an example of a Drive-to-Idle procedure in a persistence support method according to an embodiment.

FIG. 6 is a flowchart showing an example of a Drive-to-Idle procedure in a persistence support method according to an embodiment, and FIG. 7 is a diagram for explaining an example of a Drive-to-Idle procedure in a persistence support method according to an embodiment.

In general, the most of runtime information and execution states may be stored in the memory module, and some of them may be stored in a core's cache and a row buffer of a persistence support module. In this case, execution persistence may not be given by just flushing the cache with a memory fence. Although SnG does not need a checkpoint or system images, some processes may update the memory states even after the cache flush. This may make volatile and non-volatile incoherent as well as introduce execution disparity in all running processes on the system. Further, user processes may interfere with devices that the system needs to suspend even after the cache flush and memory fence. For example, if a user process running on the second core accesses the devices that the SnG is suspending in parallel, it may make the system indeterministic.

To address these issues, in some embodiments, the SnG's Drive-to-Idle procedure may ensure that no process further changes before drawing the EP-cut. Referring to FIG. 6 and FIG. 7, an interrupt occurs in a system (e.g., a computing device) when a power event signal such as a power failure arises. When the power event signal triggers the SnG through an interrupt handler at S610, a core that executes the interrupt handler which handles the event among a plurality of cores may become a master tile 710. In some embodiments, the core that first seizes the power event signal may be the master tile 710. The master tile 710 executes the SnG Drive-to-Idle procedure. The master tile 710 first sets a system-wide persistent flag 721 at S620, and then accesses process control blocks (PCBs) of running processes (tasks) 722 sequentially at S630. In some embodiments, the master tile 710 may set the persistent flag 721 for each of all running processes 722. In some embodiments, the process control block may be implemented as a data structure describing a process task, for example, a task_struct structure that is a data structure describing the process task in the Linux kernel. In some embodiments, the master tile 710 may sequentially access the PCBs of all processes running in the system from an initial process (init_task). The initial process (init_task) is a process that becomes a parent of all processes, and the master tile 710 may access the PCBs of other processes through the initial process.

The master tile 710 assigns each process to an appropriate worker tile 730 in consideration of load balance in the process of sequentially accessing the PCBs at S640. In some embodiments, the master tile 710 may sets a signal pending flag (e.g., "TIF_SIGPENDING") in the PCB of each process and schedule the corresponding process to a run queue 7411 of the appropriate worker tile 730 in a balanced way so that the corresponding worker tile 730 can run the process immediately. In this way, by setting the signal pending flag, the effect of sending a signal (a fake signal) to each processor can be generated. In some embodiments, the master tile 710 may call a predetermined function (e.g., set_tsk_need_resched( ) of the Linux kernel) so that each process can be scheduled to the run queue 741 of the corresponding worker tile 730. In some embodiments, the master tile 710 may schedule each process to the run queue 741 of the corresponding worker tile 730, and then issue an interrupt (e.g., IPI) so that the worker tile 730 can execute the corresponding process immediately.

The worker tile 730 to which the process is assigned, since the assigned process is in a signal pending state, removes the assigned process (the running process) from the run queue 741 at S650. In some embodiments, the worker tile 730 to which the process is assigned may execute a signal handler 742 since the assigned process is in the signal pending state (or in response to the signal pending flag). When the system-wide persistent flag 721 is enabled (or set) (or in response to the system-wide persistent flag 721), the signal handler 742 may set the corresponding process to an uninterruptable state (e.g., "TASK_UNINTERRUPTABLE" in the Linux kernel), remove the corresponding process from the run queue 741, and make the corresponding process wait by putting it to a wait queue 743. As such, the process may wait in the wait queue 743 in the uninterruptible state so that the process can be no longer executed.

When all processes are removed from the run queue 741, each worker tile 730 executes an idle task 750 at S660. In some embodiments, a kernel pointer of the worker tile 730 may point to an idle process. In some embodiments, the kernel pointer may include a kernel task pointer (e.g., _cpu_up_task_pointer in the Linux kernel) and a kernel stack pointer (e.g. _cpu_up_stack_pointer). In this case, the kernel task pointer may point an idle task (idle_task), and the kernel stack pointer may point an idle stack (idle_stack). In some embodiments, each worker tile 730 may wait until the EP-cut of the Auto-Stop procedure is executed by the master tile 710 while executing the idle task 750. In the meantime, an architectural state per process may be stored on the corresponding PCB. The architecture state may include all thread's program counters and registers.

In some embodiments, the Drive-to-Idle procedure may be performed in parallel across different cores by considering load balancing. When the master tile is ready to execute an idle task, it may signal the worker tile and synchronize all cores to be in idle. In some embodiments, the Drive-to-Idle procedure may have no cache flush and memory fence operations, thereby being computation-intensive. An Auto-Stop procedure may be performed after the Drive-to-Idle procedure.

Figure 8:
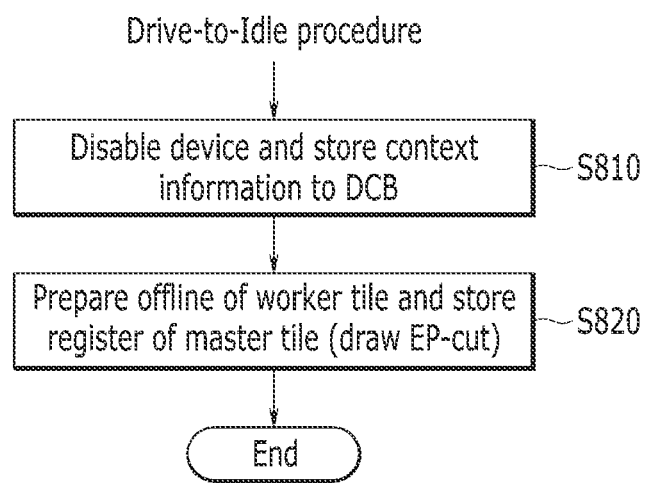
FIG. 8 is a flowchart showing an example of an Auto-Stop procedure in a persistence support method according to an embodiment.
Figure 9:
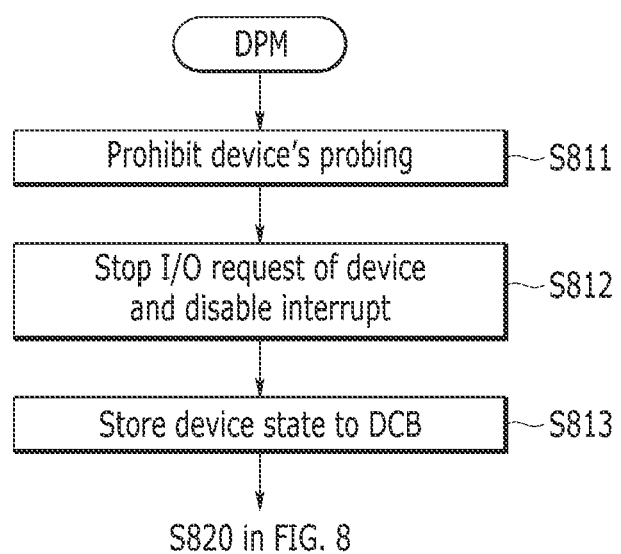
FIG. 9 is a flowchart showing an example of a device stop procedure in an Auto-Stop procedure according to an embodiment.
Figure 10:
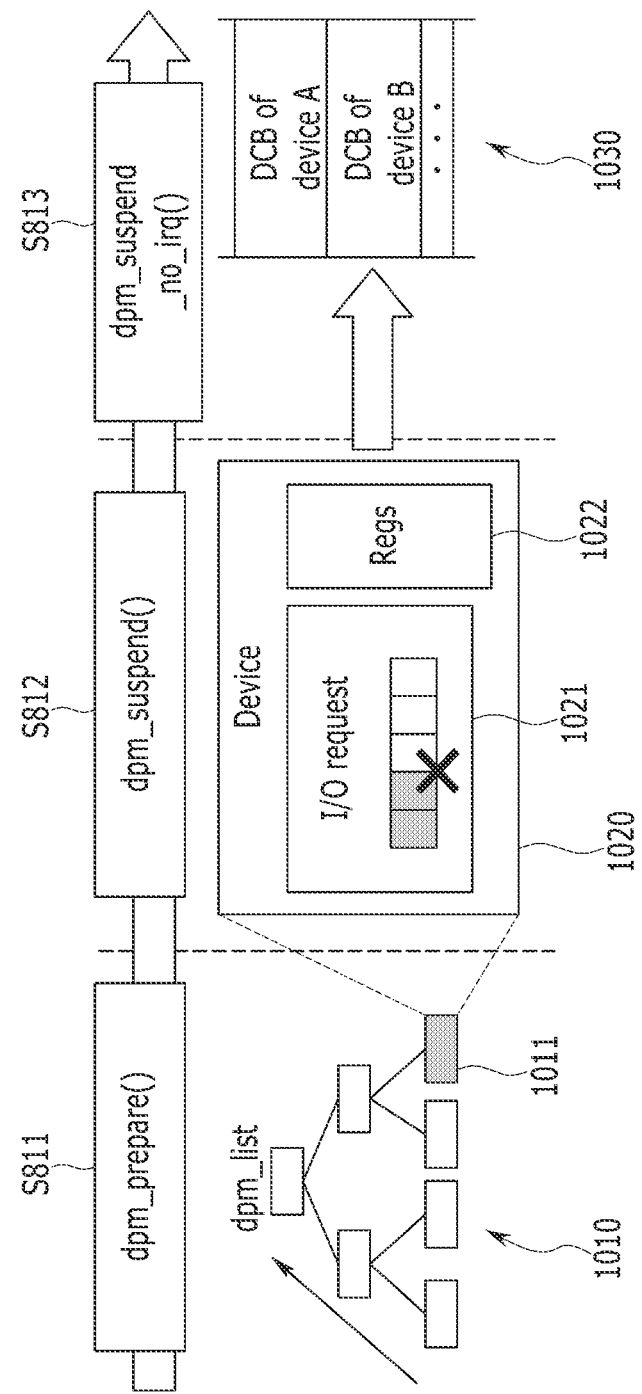
FIG. 10 is a diagram for explaining an example of a device power management procedure in an Auto-Stop procedure according to an embodiment.
Figure 11:
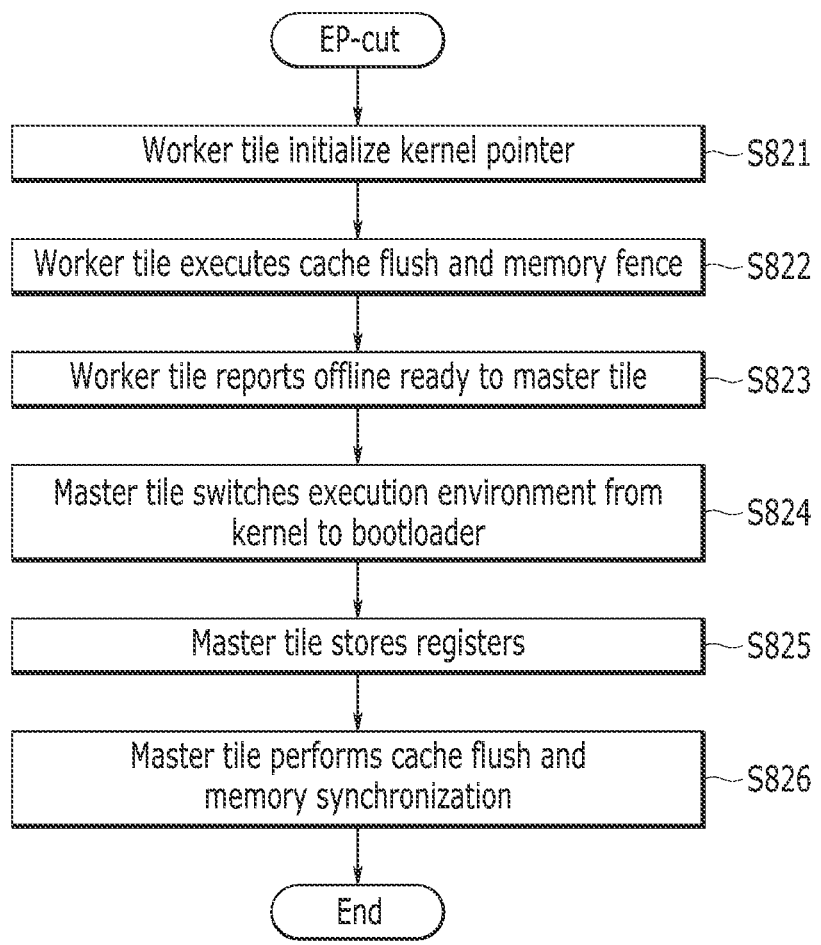
FIG. 11 is a flowchart showing an example of an EP-cut procedure in an Auto-Stop procedure according to an embodiment.
Figure 12:
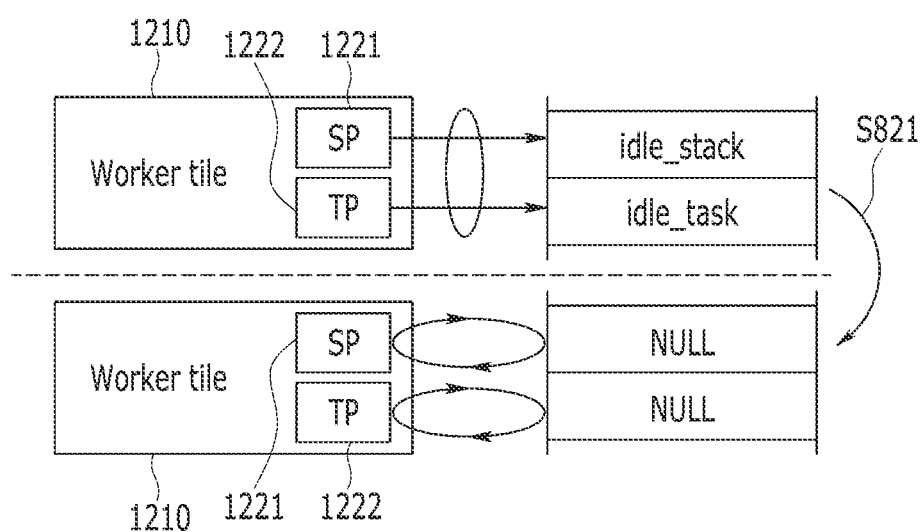
FIG. 12 is a drawing for explaining an example of an EP-cut procedure of a worker tile in an Auto-Stop procedure according to an embodiment.
Figure 13:
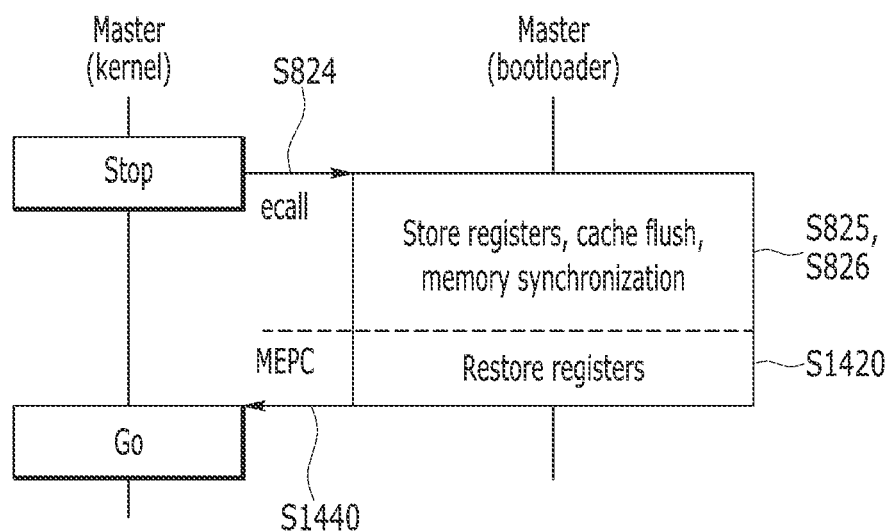
FIG. 13 is a diagram for explaining an example of an EP-cat procedure of a master tile in an Auto-Stop procedure according to an embodiment.

FIG. 8 is a flowchart showing an example of an Auto-Stop procedure in a persistence support method according to an embodiment. FIG. 9 is a flowchart showing an example of a device stop procedure in an Auto-Stop procedure according to an embodiment, and FIG. 10 is a diagram for explaining an example of a device power management procedure in an Auto-Stop procedure according to an embodiment. FIG. 11 is a flowchart showing an example of an EP-cut procedure in an Auto-Stop procedure according to an embodiment, FIG. 12 is a drawing for explaining an example of an EP-cut procedure of a worker tile in an Auto-Stop procedure according to an embodiment, and FIG. 13 is a diagram for explaining an example of an EP-cut procedure of a master tile in an Auto-Stop procedure according to an embodiment.

Referring to FIG. 8, after a Drive-to-idle procedure, SnG performs an Auto-Stop procedure. In the Auto-Stop procedure, the master tile disables other devices of a computing device, including a peripheral device, and stops the device by storing context information of the device in a predetermined block of a persistent memory module (e.g., 220 in FIG. 2) at S810. In some embodiments, the predetermined block may be a device control block (DCB). In some embodiments, the context information may include configuration information of the device and state information of the device. In some embodiments, the master tile may stop input/output (I/O) requests of the device. In some embodiments, the master tile may utilize a device power management (DPM) mechanism (e.g., a DPM mechanism of the Linux kernel). The DPM may proceed in a plurality of phases (e.g., three phases) in order.

Referring to FIG. 9 and FIG. 10, in each DPM phase, the master tile may visit each device driver 1011 listed up in a DPM list (dpm_list) 1010 and execute an internal callback function of the device driver 1011 corresponding to each DPM phase. The callback function (dpm_prepare( )) of the first phase (DPM preparation phase) may prohibit probing of a new device at a system-level in S811. The callback function (dpm_suspend( ) of the second phase (DPM suspend phase) may stop an I/O request 1021 of the device 1020 and disable an interrupt to disable (power down) the device at 812. The callback function (dpm_suspend_noirq( )) of the third phase (DPM interrupt phase) may store (dump) a state of the device to the DCB of a persistent memory module 1030 at S813. The DCB may be provided per device. In some embodiments, since there may be dependency among devices, the master tile may call the devices in the order regulated by the DPM (e.g., in the order listed up in the DPL list (dpm_list)). Next, the master tile may read a device-related memory region (e.g., a register), which is not physically located to the persistent memory module 1030 but is memory-mapped, and may write device information (context information) to the DCB and flush a cache of the master tile.

Referring to FIG. 8 again, the master tile prepares offline of the worker tile and stores a register of the master tile to the persistent memory module 1030 to draw an EP-cut at S820. In some embodiments, a procedure S820 of drawing the EP cut may be performed as follows.

Referring to FIG. 11 and FIG. 12, in order to draw the EP-cut, each worker tile 1210 may initialize its kernel pointer to null at S821. Then, when power is recovered, all cores can be ready to be run by referring to the kernel pointers initialized to null. In other words, the SnG may clean the kernel pointers so that all the cores can be correctly synchronized after the system is recovered. In some embodiments, the kernel pointer may include a kernel task pointer (e.g., _cpu_up_task_pointer of the Linux kernel) 1221 and a kernel stack pointer (e.g., _cpu_stack_pointer) 1222. In some embodiments, the kernel task pointer 1221 indicating an idle task (idle_task) and the kernel stack pointer 1222 indicating an idle stack (idle_stack) may be initialized to null, respectively. The worker tile 1210 may perform a cache flush and confirm whether all memory requests are completed by issuing a memory fence after executing the cache flush at S822. When the memory requests are completed, the worker tile 1210 may report to the master tile that it is ready to be offline at S823.

Referring to FIG. 11 and FIG. 13, upon receiving from all worker tiles a report that they are ready to be offline, the master tile may raise a system-level exception (e.g., ecall) to switch an execution environment (context) from the kernel to a bootloader at S824. In some embodiments, the master tile may raise the system level exception by executing an ecall instruction to switch the execution environment. In some embodiments, when raising the system-level exception, an address of a kernel-side instruction following the ecall instruction may be recorded as a return address where a Go procedure will re-execute the system. In some embodiments, a machine exception program counter (MEPC) may be used as the return address, and the address of the kernel-side instruction following the ecall instruction may be recorded to a register of the MEPC.

In the bootloader, the master tile may store a register required to perform the Go procedure to the persistent memory module at S825. In some embodiments, the master tile may store the register required to the Go procedure to a bootloader control block (BCB) allocated to the persistent memory module. The register required to perform the Go procedure may include the return address (MEPC). In some embodiments, the register required to perform the Go procedure may include a bootloader-related register and a kernel-related register. The master tile may clear the persistent flag (e.g., 721 in FIG. 7) set in the Drive-to-Idle procedure, and store a Stop commit indicating that the Stop procedure has been performed to the persistent memory module (e.g., BCB) at S826. Further, the master tile may perform the cache flush and then wait for power down at S826. In some embodiments, the master tile may perform the memory synchronization (memory fence) after performing the cache flush.

Figure 14:
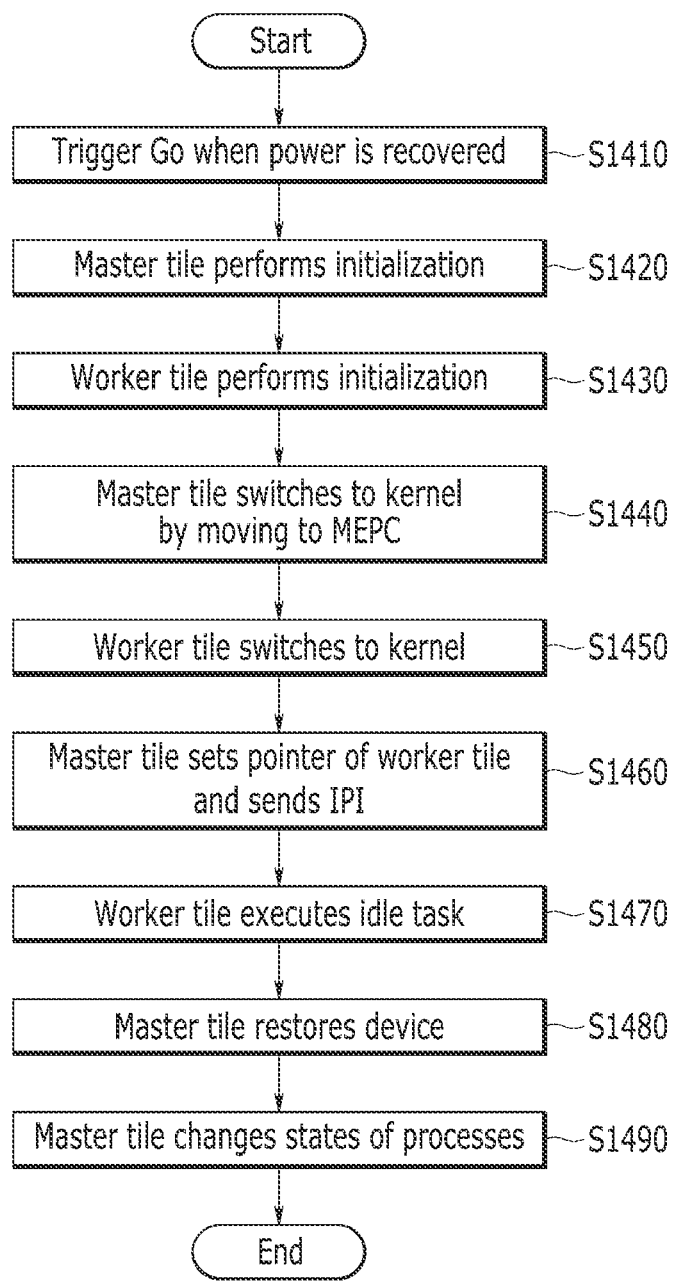
FIG. 14 is a flowchart illustrating an example of a Go procedure in a persistence support method according to an embodiment.

FIG. 14 is a flowchart illustrating an example of a Go procedure in a persistence support method according to an embodiment.

Referring to FIG. 14, when power is recovered, a Go procedure is triggered at S1410. In some embodiments, when the power is recovered, all cores can execute a bootloader. In the bootloader, the core may check the Stop commit, and if the Stop commit is valid, the Go procedure may be loaded into the bootloader and be executed. If the Stop commit is invalid, a cold boot procedure may be performed.

In the bootloader, the master tile restores registers stored in the persistent memory module (e.g., BCD) to the master tile and performs initialization. In some embodiments, the master tile may perform system initialization and master tile initialization at S1420. In some embodiments, the master tile may perform initialization by configuring an interrupt handler and activating a floating point unit (FPU). In the bootloader, the worker tile waits until the initialization of the master tile is completed, and performs initialization of the worker tile at S1430 when the initialization of the master tile is completed. In some embodiments, the master tile may power up the worker tile and reconfigure the worker tile's registers.

As shown in FIG. 13, the master tile switches an execution environment from the bootloader to a kernel by moving to a return address (e.g., MEPC) restored from the persistent memory module (e.g., BCB) after completing the initialization, and performs a kernel-side Go procedure at S1440. In some embodiments, the MEPC may store a next address of the last instruction which has executed the Stop procedure in the kernel side (i.e., an address of an EP-cut). In this case, instructions to be executed for the Go procedure in the kernel side may be defined from the address of the E-cut. In some embodiments, the master tile may activate a virtual address and flush a translation lookaside buffer (TLB) during the switch from the bootloader to the kernel.

The worker tile switches to the kernel after completing initialization in the bootloader, and waits until its kernel pointer (e.g., kernel task pointer and kernel stack pointer) is set by the master tile and an interrupt (e.g., IPI) from the master tile is received at S1450. In some embodiments, the worker tile may activate a virtual address and flush a translation lookaside buffer (TLB) during the switch from the bootloader to the kernel.

The master tile sets the kernel pointer of the worker tile as the first phase of the kernel-side Go procedure, and sends the interrupt (e.g., IPI) to the worker tile at S1460. In some embodiments, the master tile may allocate an idle task (process) to the kernel pointer (kernel task pointer) of each worker tile and send the IPI to each worker tile. After the setting of the kernel pointer is completed, the worker tile refers to the kernel pointer to execute the idle task, and waits until another process is scheduled at S1470. In some embodiments, the worker tile may execute a worker tile initialization function of the kernel and then execute the idle task.

The master tile restores a device at S1480. In some embodiments, the master tile may call a DPM callback to restore the device. A callback function (dpm_resume_noirq( )) for DPM interrupt resume may restore a device state from the persistent memory module and enable a corresponding device driver to receive the interrupt. A callback function (dpm_resume( ) for DPM resume and a callback function (dpm_complete( ) for DPM completion may allow a target device to recover or reinitialize a context.

The master tile sequentially accesses PCBs of all processes and normally schedules the processes to the cores at S1490. In some embodiments, the master tile may sequentially access the PCBs of all the processes and change a state of each process from a non-interruptible state (e.g. "TASK_UNINTERRUPTABLE" in the Linux kernel) to a normal state (e.g. "TASK_NORMAL" in the Linux kernel) so that the processes can be scheduled normally.

Although the Linux kernel has been described as an example of the OS kernel in FIG. 6 to FIG. 14, various embodiments may be applied to other OS kernels. In this case, configurations of the Linux kernel may be replaced with corresponding configurations of another OS kernel.

As described above, since various non-persistent state information such as the process states and the device information can be converted into persistence information in an event of a power failure, all stopped processes on the processor can be immediately executed when the power is recovered. In some embodiments, by removing physical and logical boundaries and drawing a line between persistent and non-persistent data structures, the existing applications may not need any modifications, thereby being transparent to the non-volatile memory. In some embodiments, the persistent environment may remove checkpoints and battery/capacitance backed non-volatile memory. In some embodiments, execution Limes of various workloads may be shortened compared to a persistent system with system images and checkpoint restarts. In some embodiments, lightweight orthogonal persistence may be supported by minimizing DRAM-related hardware impacts and corresponding runtime management.

Next, a persistence support module of a computing device according to various embodiments is described with reference to FIG. 15 and FIG. 16.

Figure 15:
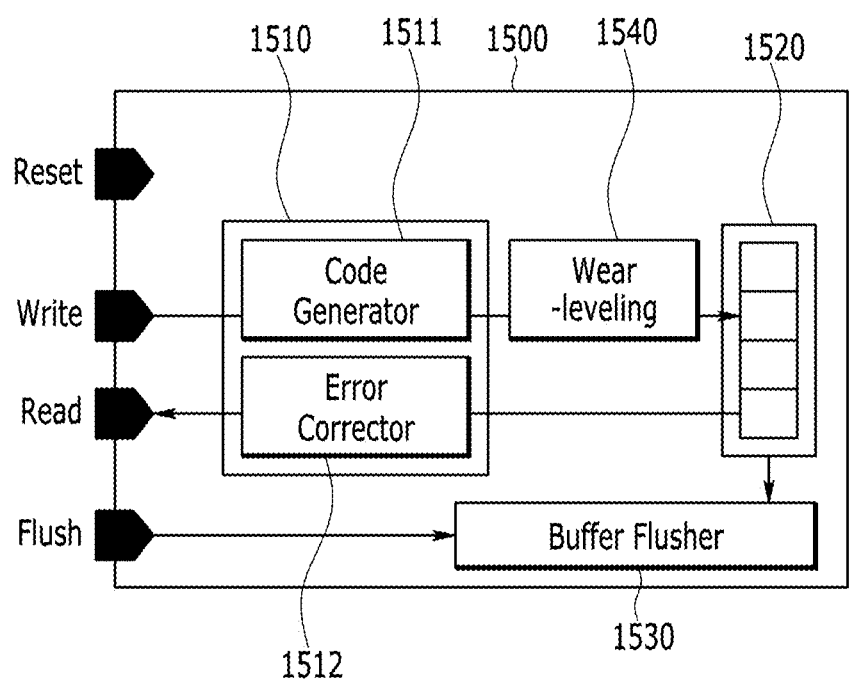
FIG. 15 is a diagram showing an example of a persistence support module according to an embodiment.
Figure 16:
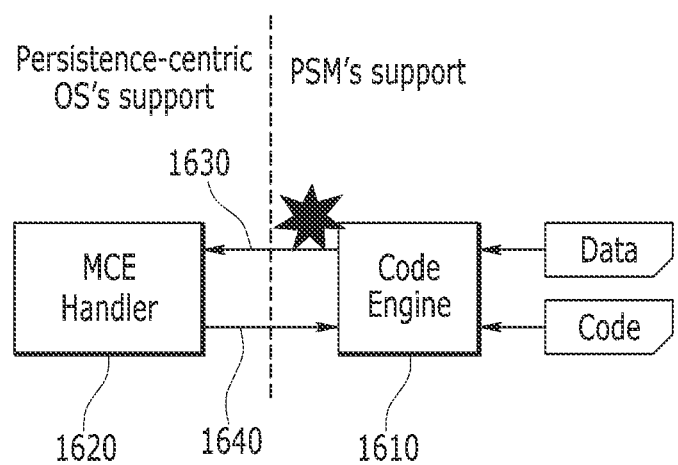
FIG. 16 is a diagram showing an example of reliability management in a persistence support module according to an embodiment.

FIG. 15 is a diagram showing an example of a persistence support module according to an embodiment, and FIG. 16 is a diagram showing an example of reliability management in a persistence support module according to an embodiment.

Referring to FIG. 15, a persistence support module 1500 includes a code engine 1510, a buffer 1520, and a buffer flusher 1530.

In some embodiments, the persistence support module 1500 may have write, read, flush, and reset ports, and may expose these ports to a processor. This structure may be implemented in an existing memory bus or crossbar switch. In some embodiments, the ports may be integrated into a processor complex over an advanced extensible interface (AXI). In some embodiments, the ports may be integrated into a typical front-side bus such as HyperTransport or a direct media interface.

Unlike a DRA M, writes of the non-volatile memory such as PRAM are four to eight times slower than reads at the processor-side point of view. Since an OS waits for write completion when a cache flush or a memory fence is issued to a persistent memory module, write latency may be mostly tolerable. However, if a write is issued to a specific region and the write blocks a following read service, long write latency may be matter. A reason why PRAM writes require long latency is caused by cooling off the PRAM's thermal core. Overwrite and read-after-write operations may prevent the persistence support module from securing the PRAM's cooling time.

To solve the address the overwrite issue, the persistence support module 1500 may use the buffer 1520. In some embodiments, the buffer 1520 may be a row buffer. In this case, the row buffer 1520 may be provided for each PRAM device of the persistent memory module. In some embodiments, the row buffer 1520 may be implemented by a block RAM (BRAM). The row buffer 1520 may be assigned to a page that a processor has just requested. When there is a following write to the same page, it may be aggregated by the row buffer 1520 and served in the next. When a flush instruction is issued, the buffer flusher 1530 may transfer data stored in the row buffer 1520 to a target PRAM device.

To address the read-after-write issue, the persistence support module 1500 may use the code engine 1510. Since most applications exhibit more reads (loads) than writes (stores), read-after-write operations may make early-return writes mostly useless. To this end, the code engine 1510 may include a code generator 1511 and an error corrector 1512, and may provide a non-blocking service.

When a memory request is a write request, the code generator 1511 may generate a non-blocking code by coding target data of the memory request. Then, the code generator 1511 may store the non-blocking code together with the target data in the persistent memory module. In some embodiments, the persistent memory module may further include a PRAM device designated for non-blocking code. Accordingly, the target data and the non-blocking code may be stored in different PRAM devices. In some embodiments, the code generator 1511 may store the non-blocking code in a DRAM module.

In some embodiments, the code generator 1511 may divide the target data into a plurality of sub-data and generate the non-blocking code by coding the plurality of sub-data. In this case, the plurality of sub-data and the non-blocking code may be respectively stored in different PRAM devices. In one embodiment, when the code generator 1511 divides the target data into two sub-data, the two sub-data may be stored in two PRAM devices, respectively, and the non-blocking code may be stored in another PRAM device (e.g., a PRAM device designated for the non-blocking code).

For example, if the target data is 64-byte data, the code generator 1511 may divide the target data into two 32-byte sub-data. The code generator 1511 may generate the non-blocking code by coding the two sub-data. In one embodiment, an exclusive OR (XOR) operation may be used as a coding scheme for generating the non-blocking code. When the 64-byte target data is divided into the two 32-byte sub-data DATA_A and DATA_B, a bitwise XOR operation may be performed on the 32-byte sub-data DATA_A and DATA_B so that a 32-byte non-blocking code can be generated. For example, the code generator 1511 may divide the data of "001011100110" into the sub-data of "001011" and the sub-data of "100110", and generate the non-blocking code of "101101" by the XOR operation of "001011" and "100110". The code generator 1511 may use coding schemes other than the XOR operation to generate the non-blocking code. In an example, an error correction coding (ECC) may be used as a coding scheme for generating the non-blocking code. For example, a parity code may be generated as the non-blocking code by low density parity check (LDPC) coding.

When the memory request is a read (i.e., load) request, the code engine 1510 reads data from the persistent memory module. The code engine 1510 may provide target data of the read request by reading a plurality of sub-data corresponding to the target data from a plurality of PRAM devices, respectively. As there is a PRAM device used for a service of another memory request among the plurality of PRAM device, that is, a conflicted PRAM device, the sub-data may not be read from the conflicted PRAM device until the service of another memory request is completed. In this case, the code engine 1510 may read the non-blocking code corresponding to the target data from the designated PRAM device, and the error corrector 1512 may reconstruct and provide the target based on the non-blocking code and the sub-data read from the non-conflicted PRAM devices. That is, the error corrector 1512 may restore the sub-data stored in the conflicted PRAM device based on the sub-data read from the non-conflicted PRAM devices and the non-blocking code. For example, when the target data is divided into two sub-data DATA_A and DATA_B and there is a conflict in the PRAM device in which the sub-data DATA_B is stored, the error corrector 1512 may recover the sub-data DATA_B stored in the conflicted PRAM device based on the subdata DATA_A read from the non-conflicted PRAM device and the non-blocking code. For example, when target data of "001011100110" is stored with being divided into DATA_A of "001011" and DATA_B of "100110", DATA_B of "100110" can be recovered by an NOR operation of DATA_A and the non-blocking code.

In some embodiments, the non-blocking read service may use contents disclosed in U.S. Pat. No. 10,452,531.

In some embodiments, the persistence support module 1500 may further include a wear-leveling module 1540 to evenly distribute memory requests across a plurality of memory modules of the persistent memory module. When an address space of the persistent memory module includes a plurality of blocks, the wear-leveling module 1540 may set at least one block (hereinafter referred to as a "gap block") to which data is not written among the plurality of blocks, and may shift the gap block in the address space based on a predetermined condition. In some embodiments, the wear-leveling module 1540 may repeat an operation of checking the total number of serviced writes, shifting the gap block if the total number of serviced writes is greater than a threshold, and initializing the total number of serviced writes. For example, when there are nine blocks in the address space, the wear-leveling module 1540 may set the last block as an initial gap block (empty), and set the remaining eight blocks as data-programmable blocks. Whenever the total number of writes reaches the threshold, the total number of writes may be initialized and an index of the block set as the cap block may be decreased by one. In some embodiments, when a physical address translated from a logical address is greater than or equal to an address of the gap block, the wear-leveling module 1540 may increase the corresponding physical address by one block. Accordingly, it is possible to prevent the same block from being continuously programmed.

In some embodiments, as shown in FIG. 16, for reads, the code engine 1610 may check correctness of target data and, and return the target data with an error containment bit 1630 if the target data is corrupted and cannot be corrected. If the error containment bit is detected, the host may raise a machine exception error (MCE). An MCE handler 1620 of the host may reset the persistent memory apparatus at 1640, and reinitialize the system for a cold boot by interacting with the reset port used to wipe out all memory spaces. In some embodiments, the MCE handler 1620 may be supported by a persistence-centric OS.

In some embodiments, cache flush and memory fence instructions may be mapped to the flush port. The persistence support module 1500 may refer to the flush port and, if there is the cache flush or memory fence instruction, may block incoming requests and allow all pending requests to be served from the persistent memory module. Accordingly, it can be guaranteed that there is no early-return request on the row buffer 1520.

Next, a persistent memory module of a computing device according to various embodiments of the present invention is described with reference to FIG. 17.

Figure 17:
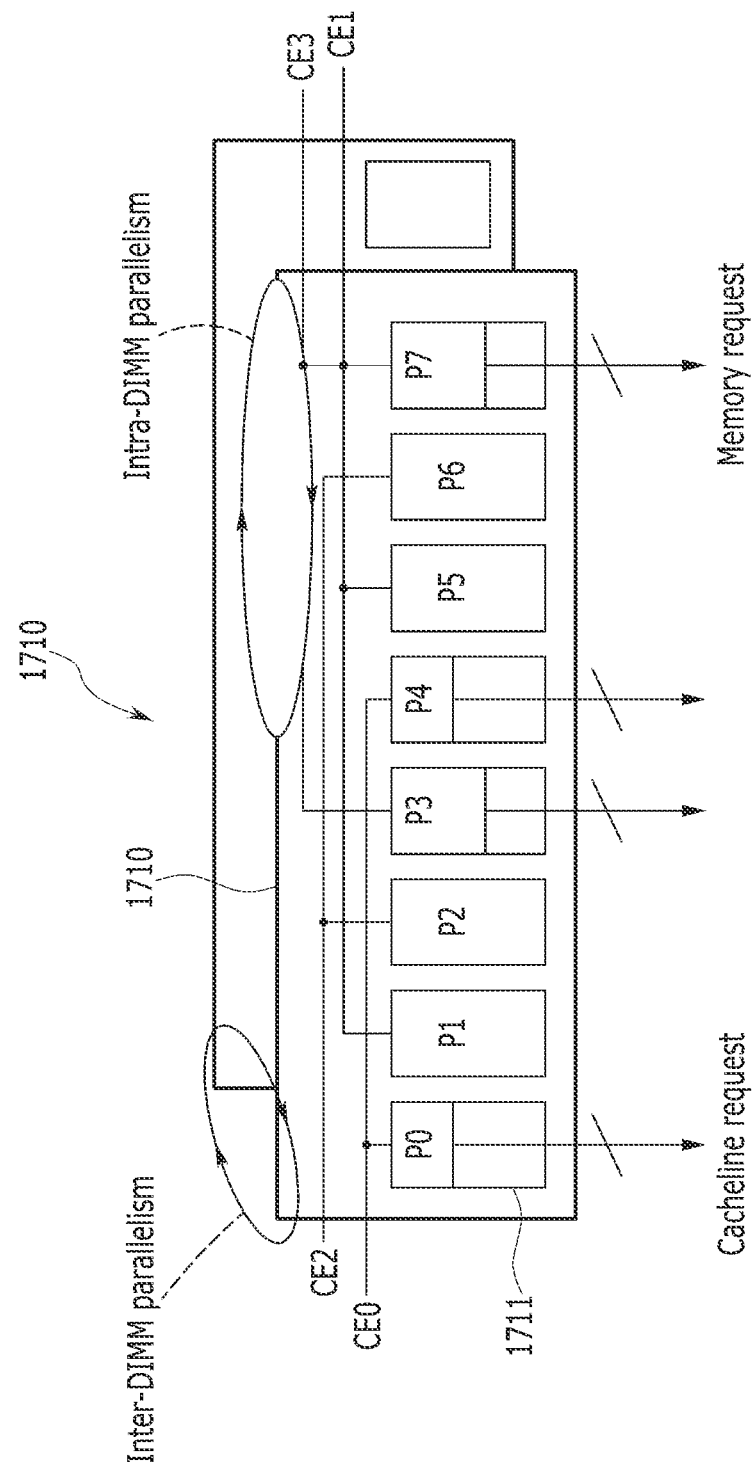
FIG. 17 is a diagram showing an example of a persistent memory module according to an embodiment.

FIG. 17 is a diagram showing an example of a persistent memory module according to an embodiment.

Referring to FIG. 17, a persistent memory module includes a plurality of memory modules 1710. Each memory module 1710 includes a plurality of PRAM devices 1711. In some embodiments, each PRAM device 1711 may be a PRAM package or a PRAM chip. In some embodiments, each memory module 1710 may use a dual in-line memory module (DIMM).

In some embodiments, each memory module may be designed with a rank of DIMM similar to DRAM. In this case, all of the PRAM devices within the rank may be connected through a single chip enable (CE). Since a granularity of a DRAM device is 8 B, eight DRAMs within a rank can serve 64 B cacheline service in parallel. That is, a 64 B-sized cacheline request can be served by a rank (8 B*8). This DRAM-like channel designs may not be able to efficiently handle PRAM-based working memory. Since a granularity of the PRAM device is 32 B, which is larger than that of the DRAM device, if each memory module 1710 is designed with the rank of DIMM similar to DRAM, the default access size may become 256 B. It may thus require read-and-modify operations to bridge disparity caused by different access granularities between the 64 B cacheline and the DIMM. As the rank of DIMM similar to DRAM enable all of eight PRAM devices, a 64 B cacheline-sized request may waste many PRA M resources per service thereby making more incoming requests suspended.

In some embodiments, as shown in FIG. 17, each memory module 1710 may be implemented in a dual-channel design in which two PRAM devices 1711 are grouped and each group shares a chip enable. For example, the first and fifth PRAM devices P0 and P4 may be shared by a chip enable CE0, the second and sixth PRAM devices P1 and P5 may be shared by a chip enable CE1, the third and seventh PRAM devices P2 and P6 may be shared by a chip enable CE2, and the fourth and eighth PRAM devices P3 and P7 may be shared by a chip enable CE5. Then, a 64 B cacheline-sized request may be immediately served by the dual-channel PRAM device (32 B*2) and the other PRAM devices may serve incoming memory requests. For example, the chip enable CE0 may allow the first and fifth PRAM devices P0 and P4 to serve the 64 B cacheline-sized request, and the chip enable CE3 may allow the other PRAM devices P3 and P7 to serve the memory request. In this way, the requests can be interleaved across all PRAM devices of a rank through intra-DIMM parallelism. Further, inter-DIMM parallelism, which allocates memory requests to different memory modules (different DIMM ranks), may also be performed.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A method of supporting persistence of a computing device,
wherein the computing device includes a memory module including a non-volatile memory and a processor including a plurality of cores including a plurality of first cores and a second core,
the method comprising:
performing a stop procedure including a first procedure and a second procedure upon a power failure, wherein the performing the first procedure comprises:
accessing, by a master tile being the second core, process control blocks of a plurality of processes being run;
scheduling, by the master tile, each process of the plurality of processes to a run queue of a corresponding worker tile of a plurality of worker tiles, each worker tile being a corresponding first core among the plurality of first cores;
removing, by the corresponding worker tile, the corresponding scheduled process from the run queue and making, by the corresponding worker tile, the removed process wait in a waiting queue; and
executing, by the corresponding worker tile, an idle task,
wherein the performing the second procedure comprises stopping, by the master tile, a device included in the computing device.

2. The method of claim 1, wherein a core executing an interrupt handler configured to handle an event of the power failure among the plurality of cores becomes the second core.

3. The method of claim 1, wherein the scheduling of each process of the plurality of processes comprises sending, by the master tile, an interrupt to each corresponding first core among the plurality of first cores based on a predetermined load balance after scheduling each corresponding process in the run queue of each corresponding first core among the plurality of first cores.

4. The method of claim 1, wherein
the performing the first procedure further comprises setting, by the master tile, a system-wide persistent flag upon the power failure, and
wherein the accessing the process control blocks comprises setting, by the master tile, a signal pending flag of the process control block of each process while accessing the process control blocks.

5. The method of claim 4, wherein the making the removed process wait comprises:
executing, by each worker tile of the plurality of worker tiles, a signal handler in response to the signal pending flag; and
changing, by the signal handler, each process to an uninterruptible state in response to the persistent flag.

6. The method of claim 1, wherein the stopping the device comprises disabling, by the master tile, the device and storing, by the master tile, context information of the device to a device control block of the memory module.

7. The method of claim 6, wherein the stopping the device further comprises stopping, by the master tile, the device based on a device power management mechanism.

8. The method of claim 1,
wherein the performing the second procedure further comprises:
preparing, by the master tile offline of the first cores; and
storing, by the master tile, a register of the second core to the memory module.

9. The method of claim 8, wherein the preparing the offline comprises:
initializing, by each worker tile of the plurality of worker tiles, a kernel pointer of the corresponding worker tile of the plurality of worker tiles to null;
flushing, by each worker tile of the plurality of worker tiles, a cache of the corresponding worker tile and executing a fence instruction; and
reporting, by each worker tile of the plurality of worker tiles, to the master tile that each worker tile of the plurality of worker tiles is ready to be offline in response to memory requests of each first core of the corresponding worker tile of the plurality of worker tiles being completed.

10. The method of claim 9, wherein the storing the register comprises:
switching, by the master tile, an execution environment from a kernel to a bootloader in response to a report that the first cores are ready to be offline from the first cores;
storing, by the master tile, the register to a bootloader control block of the memory module; and
storing, by the master tile, a commit indicating that the stop procedure has been performed to the bootloader control block.

11. The method of claim 9, wherein the register of the second core includes a register required to perform a go procedure to be performed upon power recovery, and
wherein the register required to perform the go procedure includes a return address where a system is to be re-executed in the go procedure.

12. The method of claim 11, wherein the switching the execution environment comprises raising a system-level exception to switch the execution environment from the kernel to the bootloader, and
wherein an address of a kernel-side instruction following an instruction for the system-level exception is recorded to a machine exception program counter as the return address.

13. The method of claim 1, further comprising performing a go procedure upon power recovery, wherein the performing the go procedure comprises:
restoring, by the master tile, a register stored in the memory module to the second core;
performing, by the master tile, an initialization of the master tile;
performing, by each of the corresponding worker tiles, an initialization of the corresponding worker tile;
setting, by the master tile, a kernel pointer of each first core and sending, by the master tile, an interrupt to each first core of the plurality of first cores; and
accessing, by the master tile, the process control blocks of the processes to schedule the processes.

14. The method of claim 13, wherein the register is stored in a bootloader control block of the memory module, and
wherein the performing the go procedure further comprises switching, by the master tile, an execution environment from a bootloader to a kernel after performing the initialization.

15. The method of claim 14, wherein the register stores a return address that is a next address of a last instruction that has executed the stop procedure, and the switching the execution environment comprises moving to the return address.

16. The method of claim 13, wherein the performing the go procedure further comprises executing, by each worker tile of the plurality of worker tiles, idle tasks and waiting, by the corresponding worker tile of the plurality of worker tiles, to be scheduled after the kernel pointer of each worker tile of the plurality of worker tiles is set.

17. The method of claim 13, wherein the performing the go procedure further comprises:
   checking, by the master tile, a commit indicating that the go procedure has performed; and
   performing, by the master tile, the go procedure in response to the commit being valid.

18. A computing device comprising:
   a memory module including a non-volatile memory; and
   a processor including plurality of cores including a plurality of first cores and a second core,
   wherein the processor is configured to, by executing one or more instructions stored in the memory module, perform a stop procedure upon a power failure, and perform a go procedure upon power recovery, and
   wherein the processor is configured to, in the stop procedure:
      access, by a master tile being the second core, process control blocks of a plurality of processes being run;
      schedule, by the master tile, each process of the plurality of processes to a run queue of a corresponding worker tile of a plurality of worker tiles, each worker tile being a corresponding first core among the plurality of first cores;
      remove, by the corresponding worker tile, the scheduled process from the run queue and make, by the corresponding worker tile, the removed process wait in a waiting queue;
      execute, by the corresponding worker tile, an idle task; and
      stop, by the master tile, a device included in the computing device.

19. A computer program stored in a non-transitory computer-readable medium of, when executed by a computing device including a memory module including a nonvolatile memory and a processor including a plurality of cores including a plurality of first cores and a second core, configuring the computing device to execute, upon a power failure:
   accessing, by a master tile being the second core, process control blocks of a plurality of processes being run,
   scheduling, by the master tile, each process of the plurality of processes to a run queue of a corresponding worker tile of a plurality of worker tiles, each worker tile being a corresponding first core among the plurality of first cores;
   removing, by the corresponding worker tile, the corresponding scheduled process from the run queue and making, by the corresponding worker tile, the removed process wait in a waiting queue;
   executing, by the corresponding worker tile, an idle task; and
   stopping, by the master tile, a device included in the computing device.

* * * * *